United States Patent
Xu et al.

(10) Patent No.: US 12,419,226 B2
(45) Date of Patent: Sep. 23, 2025

(54) STRING TRIMMER WITH BUILT-IN FAN FOR BLOWING CUT GRASS

(71) Applicant: Globe (Jiangsu) Co., Ltd., Changzhou (CN)

(72) Inventors: Zhezhe Xu, Changzhou (CN); Yi Xie, Changzhou (CN); Chenglong Yuan, Changzhou (CN)

(73) Assignee: Globe (Jiangsu) Co., Ltd., Changzhou (CN)

( * ) Notice: Subject to any disclaimer, the term of this patent is extended or adjusted under 35 U.S.C. 154(b) by 818 days.

(21) Appl. No.: 17/692,192

(22) Filed: Mar. 11, 2022

(65) Prior Publication Data

US 2022/0287237 A1 Sep. 15, 2022

(30) Foreign Application Priority Data

Mar. 12, 2021 (CN) .......................... 202110270236.7

(51) Int. Cl.
*A01G 3/06* (2006.01)
*A01D 34/416* (2006.01)
*A01D 34/47* (2006.01)
*A01D 34/58* (2006.01)
*A01D 34/84* (2006.01)
*A01D 43/077* (2006.01)
*A01D 101/00* (2006.01)

(52) U.S. Cl.
CPC ........... *A01G 3/062* (2013.01); *A01D 34/416* (2013.01); *A01D 34/475* (2013.01); *A01D 34/58* (2013.01); *A01D 34/84* (2013.01); *A01D 43/077* (2013.01); *A01D 2101/00* (2013.01)

(58) Field of Classification Search
CPC .... A01D 34/416; A01D 43/077; A01D 34/84; A01G 3/062; A01G 20/47
See application file for complete search history.

(56) References Cited

U.S. PATENT DOCUMENTS

| | | | | |
|---|---|---|---|---|
| 2,791,082 A * | 5/1957 | Mcdonough | ........... | A01D 34/84 56/17.3 |
| 4,175,622 A * | 11/1979 | Summerfelt | ........... | A01G 3/062 172/14 |
| 5,348,102 A * | 9/1994 | Roberson | ............... | A01D 34/84 172/15 |
| 5,572,856 A * | 11/1996 | Ku | ........................ | A01D 34/008 56/2 |
| 2001/0027610 A1 * | 10/2001 | Wheeler | ............... | A01D 34/736 30/276 |
| 2002/0007559 A1 * | 1/2002 | Morabit | ............... | A01D 34/416 30/276 |

(Continued)

*Primary Examiner* — Joseph M Rocca
*Assistant Examiner* — Julia C Tran

(57) ABSTRACT

A string trimmer includes a protective shield, a first motor, a blade and a fan. The first motor is arranged on one side of the protective shield, and a first rotation shaft of the first motor penetrates the protective shield to the other side of the protective shield. The blade is arranged on the other side of the protective shield, and the blade is connected with the first rotation shaft. The fan is arranged on the same side as the first motor, and the fan is mounted on the protective shield through a second rotation shaft. Wherein, a rotation speed ratio between the second rotation shaft and the first rotation shaft ranges from 0.5 to 4.

19 Claims, 16 Drawing Sheets

(56) References Cited

U.S. PATENT DOCUMENTS

| | | | |
|---|---|---|---|
| 2009/0038283 A1* | 2/2009 | Hurley | A01D 34/84 56/12.7 |
| 2009/0090094 A1* | 4/2009 | Million | A01D 34/416 56/13.4 |
| 2010/0126023 A1* | 5/2010 | Griffin | A01D 42/06 30/276 |
| 2020/0170182 A1* | 6/2020 | Guo | A01D 34/4166 |
| 2021/0029898 A1* | 2/2021 | Rosenthal | F04D 17/08 |
| 2021/0170565 A1* | 6/2021 | Lauciello | H02K 9/06 |

* cited by examiner

STRING TRIMMER WITH BUILT-IN FAN FOR BLOWING CUT GRASS

CROSS REFERENCE TO RELATED APPLICATION

The present application is based on, and claims the priority from, Chinese application number CN202110270236.7, filed on Mar. 12, 2021, the disclosure of which is hereby incorporated by reference herein in its entirety.

TECHNICAL FIELD

The disclosure belongs to the technical field of the outdoor tools, particularly to a string trimmer.

BACKGROUND

Green vegetation is an indispensable environmental element for human beings, and the awareness of greening has become more and more popular among the people. Whether in golf courses, football fields, manors, villa courtyards, or ordinary residential areas, green turf is everywhere, which brings vigor and vitality to people's lives. However, the turf may become bumpy and disorganized without people's taking care of it. As a garden tool for turf care, string trimmers are being favored by more and more users, but at the same time, users have higher and higher requirements for the functions and experience of the string trimmers.

During an actual use of the string trimmer, a lot of broken grass, dust, etc. will fly to the road surface, which enables the road surface to be very dirty, and it is necessary to use a blower or other tools to re-treat the road surface. Such operations repeat work and waste labor. And in order to meet the above blowing requirements and effects, the fan needs to achieve a large output air volume and high work efficiency.

SUMMARY

The disclosure provides a string trimmer. With the string trimmer of the disclosure, a wide range of rotation speed ratios of the fan and the blade may be obtained.

The disclosure provides a string trimmer. The string trimmer includes a protective shield, a first motor, a blade and a fan. The first motor is arranged on one side of the protective shield, and a first rotation shaft of the first motor penetrates the protective shield to the other side of the protective shield. The blade is arranged on the other side of the protective shield, and the blade is connected with the first rotation shaft. The fan is arranged on the same side as the first motor, and the fan is mounted on the protective shield through a second rotation shaft. Wherein, a rotation speed ratio between the second rotation shaft and the first rotation shaft ranges from 0.5 to 4.

In an embodiment of the disclosure, the protective shield is semicircular, and a radius of a protective shield bottom surface of the protective shield is greater than a radius of the blade.

In an embodiment of the disclosure, the protective shield bottom surface is provided with a first through hole, the first through hole is located in a middle part of a straight side of the protective shield bottom surface, a blade fixing base is arranged in the first through hole, a second through hole is arranged on the blade fixing base, and the second through hole allows the first rotation shaft to pass through.

In an embodiment of the disclosure, the protective shield is provided with a first concave part located on one side of the fan, and the first concave part is arranged on a periphery of the first through hole.

In an embodiment of the disclosure, the string trimmer includes a first casing, the first casing is mounted on the first concave part, is hollow cylindrical shaped and allows the first motor to be placed in the first casing, and a handle is arranged on the first casing, and the handle is connected with one end of a connecting rod.

In an embodiment of the disclosure, the other end of the connecting rod is provided with a control device and a power supply device, the control device is connected with the first motor, and the power supply device is connected with the first motor and the control device.

In an embodiment of the disclosure, the protective shield is provided with a second concave part, the second concave part is located on a side away from the handle, the fan is fixed on the second concave part through the second rotation shaft, and the second rotation shaft is perpendicular to the protective shield bottom surface.

In an embodiment of the disclosure, the string trimmer includes a volute, the volute is fixed on the protective shield bottom surface, the fan is located between the volute and the protective shield, a side of the volute close to the protective shield is provided with a third concave part, a fan through hole is arranged on a bottom surface of the third concave part, and the fan through hole allows the second rotation shaft to pass through.

In an embodiment of the disclosure, the protective shield is provided with an air outlet, the air outlet is a through hole arranged on the protective shield bottom surface and is located on a side of the second concave part away from the first concave part.

In an embodiment of the disclosure, a tail part of the volute is provided with an air tube, the air tube includes a trimming air tube and a mowing air tube, the mowing air tube covers the air outlet, and the trimming air tube does not contact the air outlet.

In an embodiment of the disclosure, an air outlet opening is arranged on a side of the trimming air tube in contact with the protective shield bottom surface, the air outlet opening is located on a side of the trimming air tube away from the first concave part, and an air direction of the air outlet opening is perpendicular to the first rotation shaft.

In an embodiment of the disclosure, the volute includes a U-shaped concave part on a side away from the fan, the U-shaped concave part is provided with an opening, and the opening of the U-shaped concave part is connected with an opening of the first concave part.

In an embodiment of the disclosure, the string trimmer includes an upper cover, the upper cover is connected above the U-shaped concave part, and the upper cover is provided with a plurality of air inlets.

In an embodiment of the disclosure, the string trimmer further includes a driving wheel and a driven wheel, the driving wheel and the driven wheel are arranged on the same side as the fan, the driving wheel is connected with the first rotation shaft and is located in the first concave part, the driven wheel is connected with the second rotation shaft and is located in the U-shaped concave part, and the driving wheel and the driven wheel are connected through a belt.

In an embodiment of the disclosure, the protective shield includes a plurality of air outlets, and the plurality of air outlets surround the second concave part.

In an embodiment of the disclosure, the string trimmer further includes a second motor, the second motor is arranged on the same side as the first motor, and the second motor is connected with the second rotation shaft.

In an embodiment of the disclosure, the string trimmer includes a second casing, the second casing is located on the protective shield, the second motor is arranged in the second casing, and a plurality of air inlets are arranged on a top of the second casing.

In an embodiment of the disclosure, the fan is a centrifugal fan, the fan and the second motor are connected in sequence above the second concave part through the second rotation shaft, and the fan is located between the protective shield and the second motor.

In an embodiment of the disclosure, the fan is an axial flow fan, the fan and the second motor are connected in sequence above the second concave part through the second rotation shaft, and the fan is located on a side of the second motor away from the protective shield.

In an embodiment of the disclosure, the fan includes a first fan and a second fan, the first fan, the second motor and the second fan are connected in sequence above the second concave part through the second rotation shaft, the first fan is located between the protective shield and the second motor, and the second fan is located on a side of the second motor away from the protective shield.

With the string trimmer of the disclosure as described above, a rotation speed of the fan may be different from a rotation speed of the blade through arranging the fan and the blade on different rotation shafts. A diameter of a fan blade of the fan is not affected by a structure of the first motor through arranging the fan and the blade on different sides of the protective shield.

Of course, it is not necessary for any product implementing the disclosure to achieve all of the above-described advantages simultaneously.

BRIEF DESCRIPTION OF THE DRAWINGS

In order to explain the technical solutions of the embodiments of the disclosure more clearly, the following will briefly introduce the drawings used in the description of the embodiments. Obviously, the drawings in the following description are only some embodiments of the disclosure. For those of ordinary skill in the art, other drawings can be obtained from these drawings without creative work.

DETAILED DESCRIPTION

Figure 1:
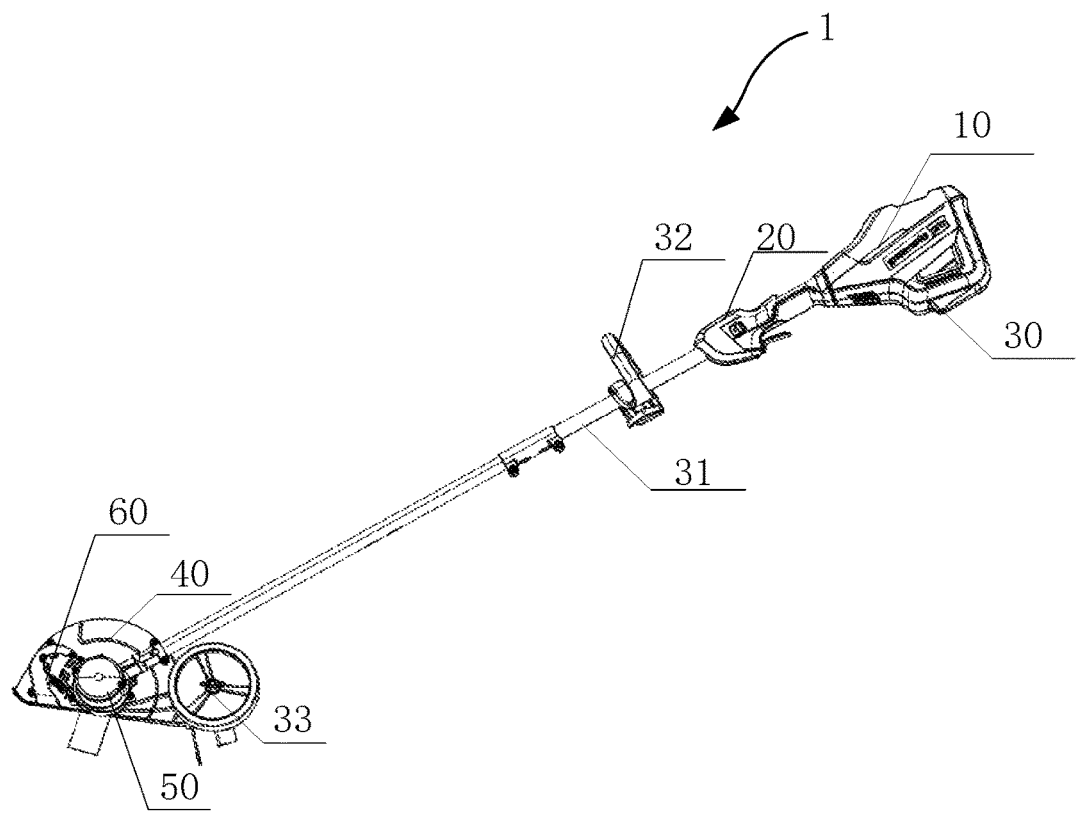
FIG. 1 is a front structural view of a string trimmer according to an embodiment of the disclosure.

The technical solutions in the embodiments of the disclosure will be clearly and completely described below with reference to the accompanying figures in the embodiments of the disclosure. Obviously, the described embodiments are only some, but not all embodiments of the disclosure. Based on the embodiments of the disclosure, all other embodiments obtained by those of ordinary skill in the art without creative efforts shall fall within the protection range of the disclosure.

Please refer to FIG. 1 through FIG. 4. The disclosure provides a sting trimmer 1. The sting trimmer 1 may realize a mowing function and a grass trimming function. When using the mowing function, an axis of a motor is perpendicular to a bottom surface, which means that a blade 500 is parallel to the ground. When using the grass trimming function, an axis of a motor is parallel to the ground, which means that a blade 500 is perpendicular to the ground. In the disclosure, the sting trimmer 1 has a blowing function when mowing or grass trimming. In the disclosure, a fan 640 and the blade 500 have different rotation speeds through arranging the fan 640 and the blade 500 on different rotation shafts, so that a suitable blowing air force may be obtained during mowing or grass trimming.

Please refer to FIG. 1 through FIG. 4. The disclosure provides various embodiments of fans 640 and blades 500 with different rotation speeds. In an embodiment of the disclosure, a driving wheel 560 is arranged on a first rotation shaft 531, a driven wheel 630 is arranged on a second rotation shaft 631, and the driving wheel 560 and the driven wheel 630 are connected through a belt 561 or a chain transmission. Through setting a ratio of a radius of the driving wheel 560 to a radius of the driven wheel 630, the first rotation shaft 531 and the second rotation shaft 631 may obtain suitable rotation speeds. In other embodiments of the disclosure, the rotation speed of the first rotation shaft 531 is controlled by a first motor 530, and the rotation speed of the second rotation shaft 631 is controlled by a second motor 632, so that the first rotation shaft 531 and the second rotation shaft 631 are independently controlled, and the first rotation shaft 531 and the second rotation shaft 631 may obtain suitable rotation speeds. For details, please refer to the embodiments and the drawings.

Figure 2:
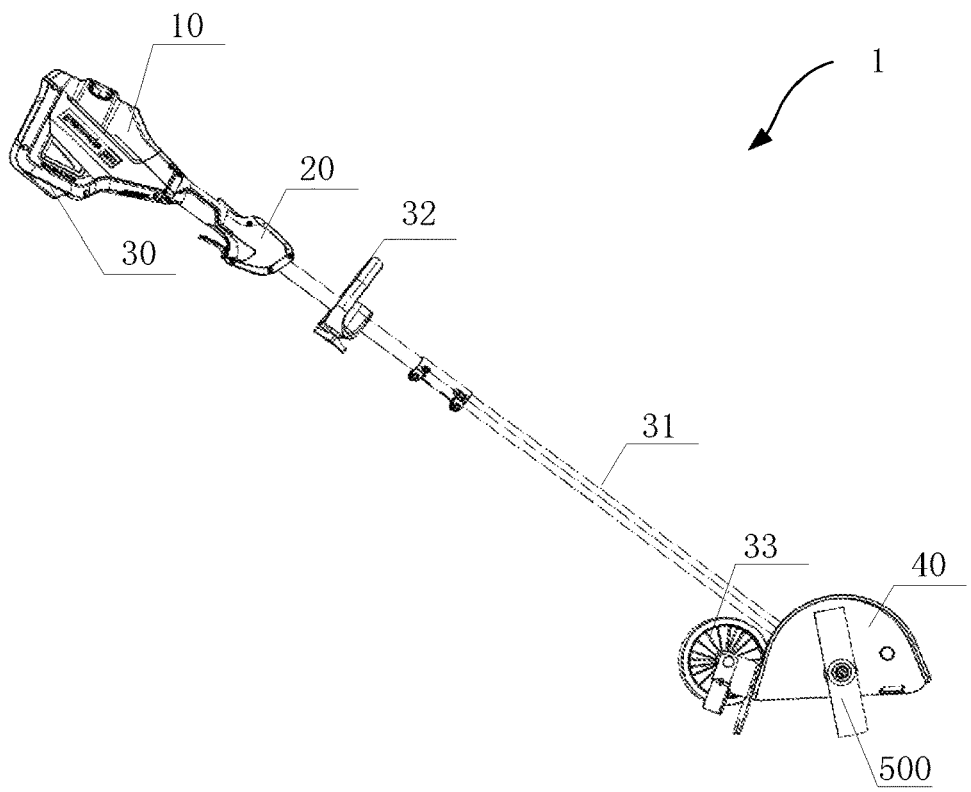
FIG. 2 is a rear structural view of the string trimmer.

Please refer to FIG. 1 and FIG. 2. The disclosure provides the string trimmer 1. The string trimmer 1 includes a power supply assembly 10, a control assembly 20, a connecting rod 31, a protective shield 40, a cutting assembly 50 and a blowing assembly 60. The power supply assembly 10 includes at least one battery pack, which is used to supply power for each electrical device of the string trimmer 1. A control panel is arranged in the control assembly 20, which is used to realize switch, speed adjustment and other functions of the string trimmer 1. The connecting rod 31 is used to connect an operation end and a working end of the string trimmer 1, the connecting rod 31 is a hollow structure, and an auxiliary handle 32 is further arranged on the connecting rod 31. The operation end includes the power supply assembly 10 and the control assembly 20, and the working end includes the protective shield 40, the cutting assembly 50 and the blowing assembly 60. The cutting assembly 50 and the blowing assembly 60 are mounted on the protective shield 40, the cutting assembly 50 is used for mowing, and the blowing assembly 60 is used for blowing the cut grass.

Figure 3:
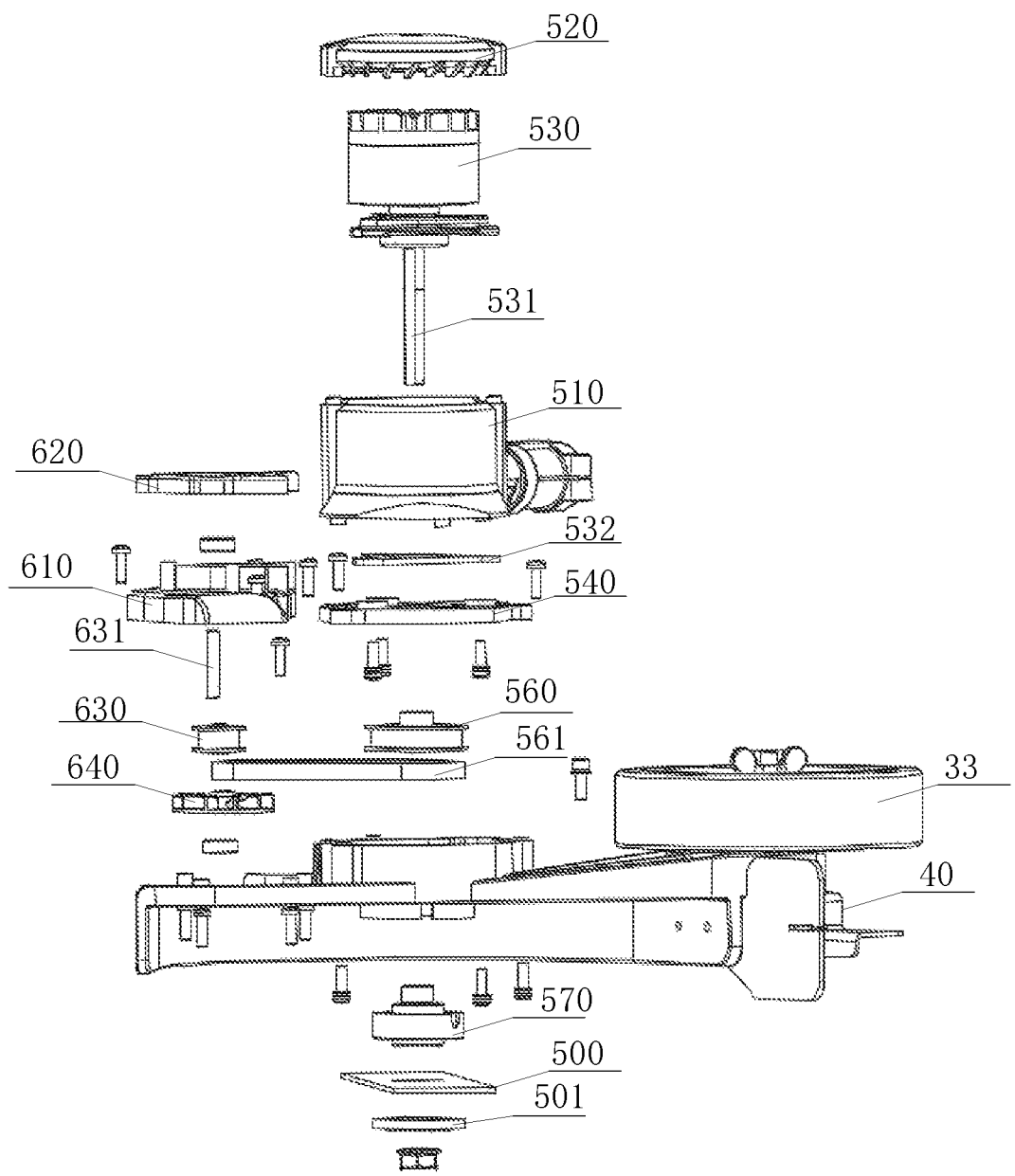
FIG. 3 is an exploded view of a working end of a belt string trimmer.

Please refer to FIG. 1 and FIG. 3. In an embodiment of the disclosure, a casing 30 is arranged at the operation end of the string trimmer 1 for arranging the power supply assembly 10 and the control assembly 20. The power supply assembly 10 includes at least one battery pack, and the battery pack is detachable. The power supply assembly 10 is electrically connected with power devices of the control assembly 20, the cutting assembly 50 and the blowing assembly 60. The battery pack is electrically connected with the control panel and the first motor 530. The control assembly 20 is arranged in the casing 30, between the power supply assembly 10 and the working end of the string trimmer 1, and close to the power supply assembly 10. The control assembly 20 includes the control panel, the control panel is electrically connected with the first motor 530 and the second motor 632, and is used to control an on-and-off and rotation speeds of the first motor 530 and the second motor 632.

Please refer to FIG. 2 and FIG. 3. In an embodiment of the disclosure, the protective shield 40, the cutting assembly 50 and a blowing assembly 60 are arranged at the working end of the string trimmer 1. The cutting assembly 50 and the blowing assembly 60 are mounted on the protective shield 40, and working parts of the cutting assembly 50 and the blowing assembly 60 are located on different sides of the protective shield 40 respectively, which means that the blade 500 and the fan 640 are located on different sides of the protective shield 40 respectively. In this embodiment, the cutting assembly 50 is connected with the connecting rod 31.

Please refer to FIG. 3 through FIG. 12. In an embodiment of the disclosure, through arranging the driving wheel 560 on the first rotation shaft 531 and arranging the driven wheel 630 on the second rotation shaft 631, the driving wheel 560 is connected with the driven wheel 630 by means of the belt 561 or the chain transmission. Through setting the ratio of the radius of the driving wheel 560 to the radius of the driven wheel 630, the first rotation shaft 531 and the second rotation shaft 631 may obtain suitable rotation speeds. In this embodiment, the cutting assembly 50 mainly includes the first motor 530 and the blade 500. The blowing assembly 60 mainly includes the fan 640 and the transmission mechanism. The transmission mechanism includes the driving wheel 560, the belt 561 and the driven wheel 630.

Figure 4:
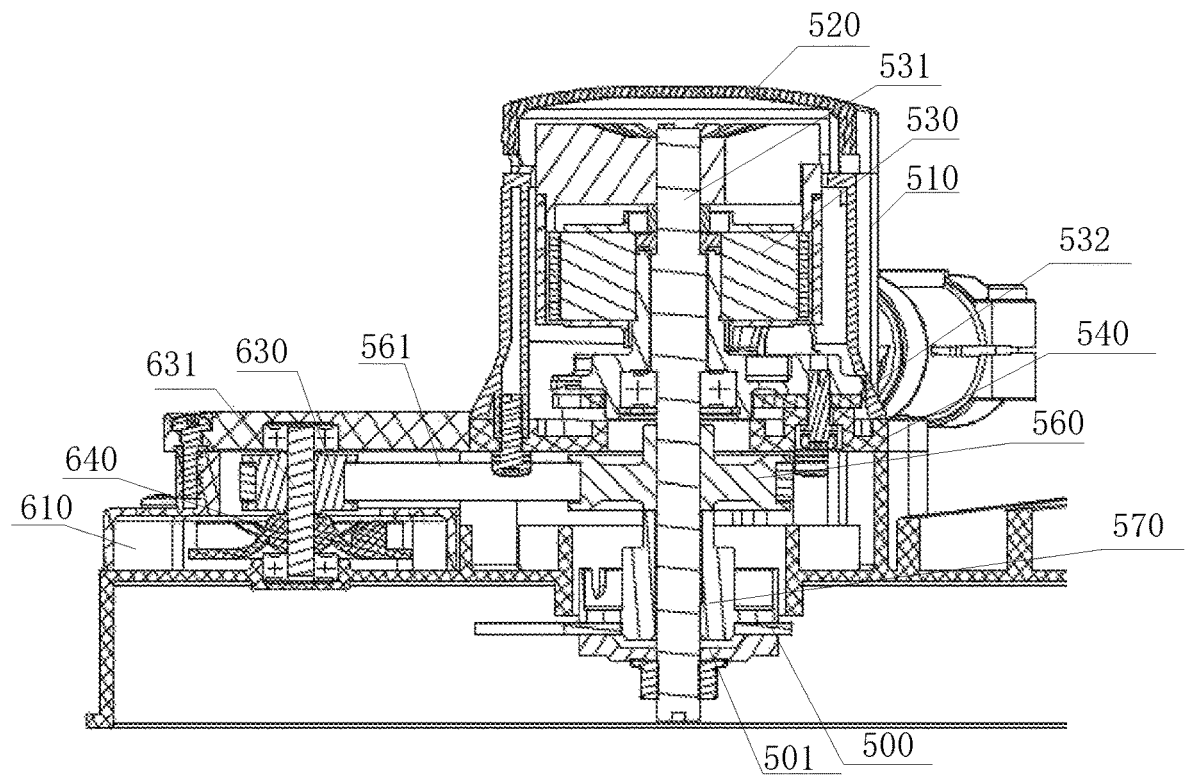
FIG. 4 is a sectional view of the working end of the belt string trimmer.
Figure 8:
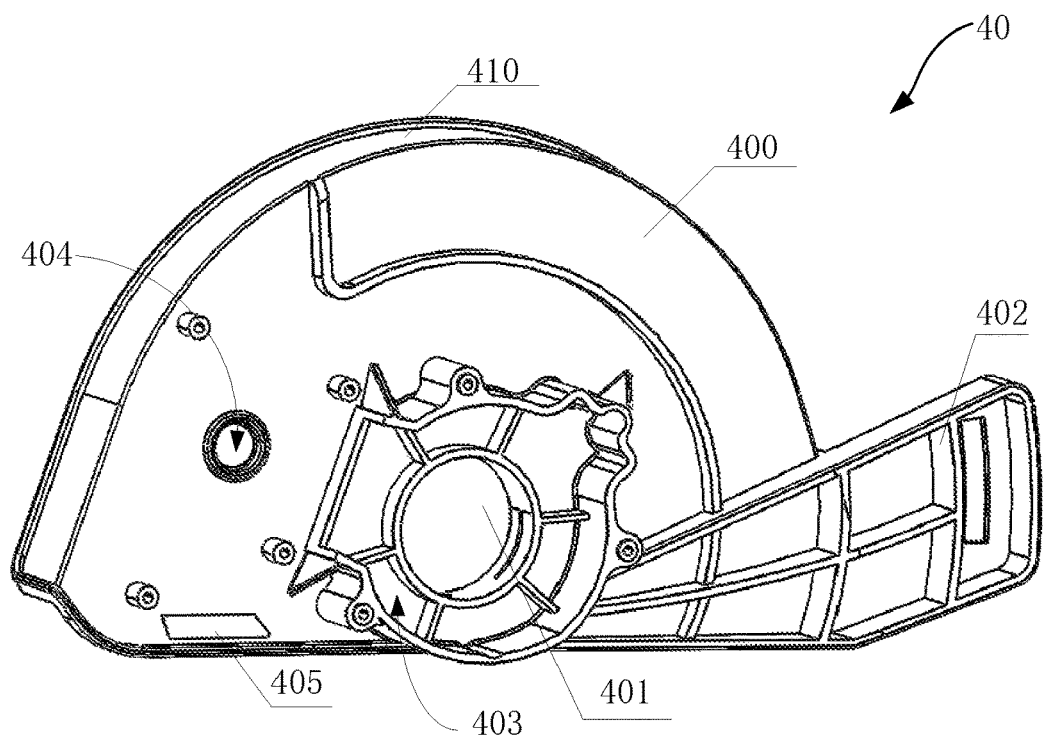
FIG. 8 is a structural view of a protective shield of the belt string trimmer.

Please refer to FIG. 4 and FIG. 8. In an embodiment of the disclosure, the protective shield 40 is semicircular. The protective shield 40 includes a protective shield bottom surface 400 and a protective shield side surface 410. The protective shield bottom surface 400 is a main body of the protective shield 40 and is semicircular. The protective shield side surface 410 is arranged on an arc side of the protective shield bottom surface 400, and the protective shield side surface 410 is perpendicular to the protective shield bottom surface 400. The blade 500 is mounted on the protective shield bottom surface 400 and located on a side of the protective shield side surface 410, and the blade 500 is parallel to the protective shield bottom surface 400. A radius of the protective shield bottom surface 400 is greater than a radius of the blade 500. The fan 640 is mounted on the protective shield bottom surface 400 and on a side opposite to the protective shield side surface 410. When using the string trimmer 1 for mowing, the protective shield bottom surface 400 is parallel to the ground, and the blade 500 is parallel to the ground. When using the string trimmer 1 for trimming, the protective shield bottom surface 400 is perpendicular to the ground, the blade 500 is perpendicular to the ground, and a straight side of the protective shield bottom surface 400 is close to the ground.

Figure 12:
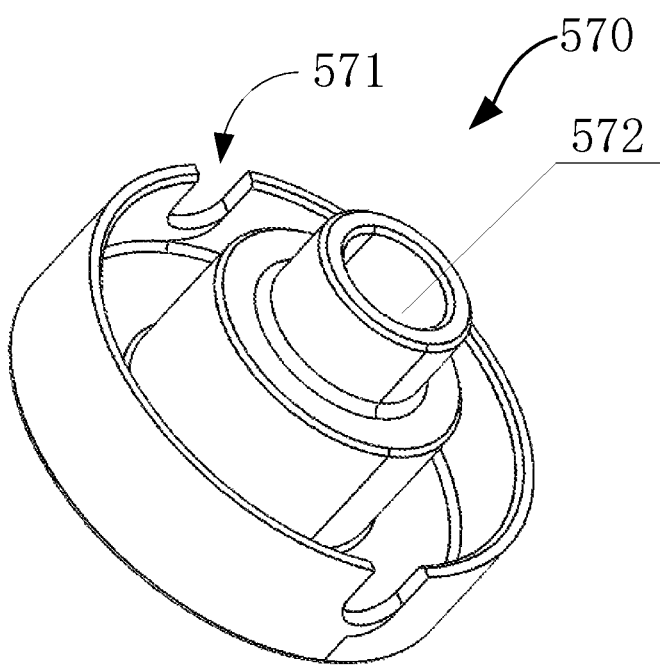
FIG. 12 is a structural view of a blade fixing base of the string trimmer.

Please refer to FIG. 4, FIG. 8 and FIG. 12, a first through hole 401 is arranged on the protective shield bottom surface 400 and close to a middle part of the straight side of the protective shield bottom surface 400, and the first through hole 401 is circular. A blade fixing base 570 is placed in the first through hole 401, and a radius of an outer circumference of the blade fixing base 570 is substantially equal to a radius of the first through hole 401.

Further, please refer to FIG. 12. The blade fixing base 570 is provided with a second through hole 572 in a shape of a circle. The blade fixing base 570 passes through the first through hole 401 to the other side of the protective shield bottom surface 400 for fixing the blade 500. And the first rotation shaft 531 of the first motor 530 is allowed to pass through the second through hole 572 of the blade fixing base 570 to the other side of the protective shield bottom surface 400. When the first motor 530 works, the first rotation shaft 531 rotates and drives the blade 500 connected with the first rotation shaft 531 to rotate. The blade fixing base 570 is provided with at least one U-shaped groove 571, the U-shaped groove 571 is located on a side close to the first motor 530 (a side away from the blade 500) for engaging with the driving wheel 560. In this embodiment, the number of U-shaped grooves 571 is, for example, two.

Figure 7:
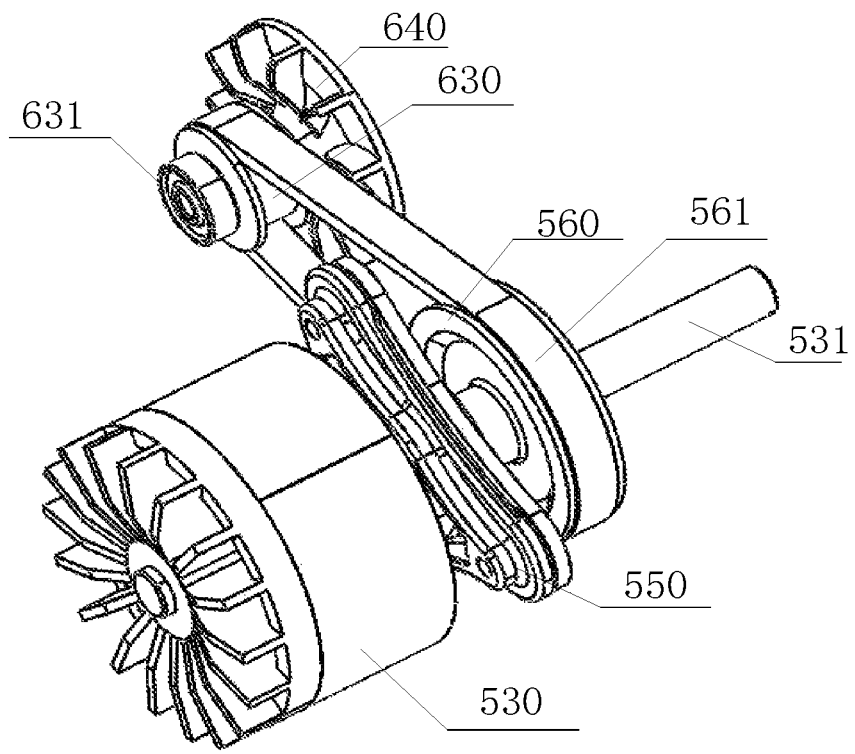
FIG. 7 is a structural view of a transmission mechanism of the belt string trimmer.

Further, please refer to FIG. 7 and FIG. 8. A side wall which is higher than the protective shield bottom surface 400 is arranged on the side of the protective shield bottom surface 400 away from the protective shield side surface 410 and at a periphery of the first through hole 401, which defines a first concave part 403 with the protective shield bottom surface 400. The first concave part 403 is used to place the driving wheel 560. An opening is further arranged on one side of the first concave part 403, and the opening of the first concave part 403 faces the fan 640 for placing the belt 561. The belt 561 connects the driving wheel 560 with the driven wheel 630.

Please refer to FIG. 4, FIG. 7 and FIG. 8. In the first concave part 403, the driving wheel 560 is placed on a side of the U-shaped groove 571 of the blade fixing base 570. A center of the driving wheel 560 is provided with a central through hole, and the central through hole is fixedly connected with an output end of the first motor 530, which means fixedly connected with the first rotation shaft 531. When the first motor 530 works, the first rotation shaft 531 rotates, and drives the driving wheel 560 and the blade 500 connected with the first rotation shaft 531 to rotate.

Figure 9:
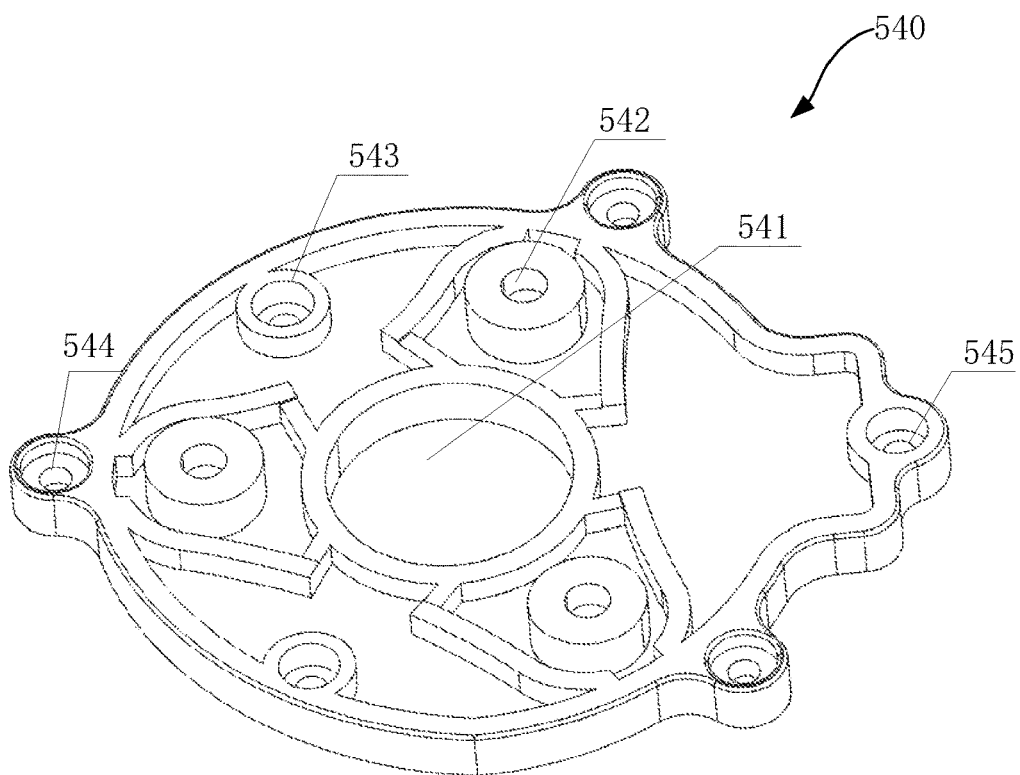
FIG. 9 is a structural view of a motor fixing plate of the belt string trimmer.

Please refer to FIG. 3, FIG. 4 and FIG. 9. Above the first concave part 403, a motor fixing plate 540 is fixedly connected on a side of the driving wheel 560 away from the blade fixing base 570. The motor fixing plate 540 is mounted above the first concave part 403 for fixing a first casing 510 and the first motor 530 on the protective shield 40. One side of the motor fixing plate 540 is fixed on a side wall of the first concave part 403, so that the motor fixing plate 540 is fixed on the protective shield 40, and the other side of the motor fixing plate 540 is fixedly connected with the first casing 510. An interior of the first casing 510 is provided with the first motor 530.

Please refer to FIG. 9. A third through hole 541 is arranged in a middle of the motor fixing plate 540, and the third through hole 541 allows the first rotation shaft 531 to pass through. On the motor fixing plate 540, a plurality of shock-absorption pad holes 542 are arranged at a periphery of the third through hole 541 for fixing the shock-absorption pad 532. The number of the shock-absorption pad holes 542 is, for example, three, and the plurality of shock-absorption pad holes 542 are evenly distributed on a circumference with the third through hole 541 as a center of the circle. On the motor fixing plate 540, a plurality of casing fixing holes 543 are arranged for fixing the first casing 510 at a periphery of the shock-absorption pad hole 542. The number of the casing fixing holes 543 is, for example, 2. On the motor fixing plate 540, a plurality of motor fixing holes 544 are further arranged at a periphery of the casing fixing hole 543 for fixing the motor fixing plate 540 on the protective shield 40. The number of the motor fixing holes 544 is, for example, 3. The motor fixing plate 540 is further provided with a connecting rod fixing hole 545 for fixing the connecting rod 31.

Please refer to FIG. 4 through FIG. 9. In an embodiment of the disclosure, the first casing 510 is in a through hollow cylindrical shape which includes a cylindrical side surface. One side of the first casing 510 is connected with the motor fixing plate 540, and the other side of the first casing 510 is provided with a motor cover 520. The first motor 530 is located in the first casing 510. In the cylindrical space defined by the first casing 510, the motor cover 520 and the motor fixing plate 540, the output end of the first motor 530, namely the first rotation shaft 531, passes through the third through holes 541 on the motor fixing plate 540, a central through hole of the driving wheel 560 and the second through hole 572 of the blade fixing base 570 in the protective shield 40 to be fixedly connected with the blade 500.

Figure 6:
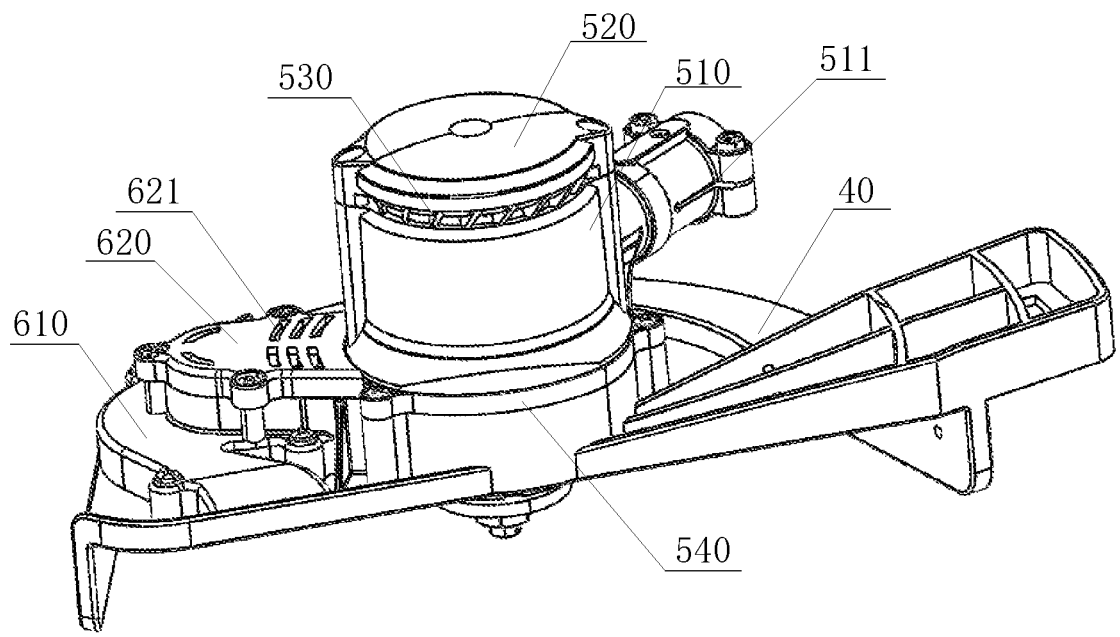
FIG. 6 is a side structural view of the working end of the belt string trimmer.

Further, please refer to FIG. 6. In an embodiment of the disclosure, a handle 511 is arranged on the first casing 510, and the handle 511 is fixedly connected with the connecting rod 31. The handle 511 is in a cylindrical hollow structure. The cylindrical hollow structure in the handle 511 communicates with a cylindrical space of the first casing 510 and penetrates the hollow connecting rod 31, which realizes an electrical connection of the control assembly 20 and the power supply assembly 10 with the first motor 530.

Please refer to FIG. 3 and FIG. 4. In an embodiment of the disclosure, a shock-absorption pad 532 is further arranged between the first motor 530 and the motor fixing plate 540. The shock-absorption pad 532 is arranged between the first motor 530 and the motor fixing plate 540 to prevent a vibration generated by the first motor 530 from affecting an operation of the driving wheel 560 on the other side of the motor fixing plate 540 when the first motor 530 is working, which affects the blade 500 and the fan 640 to work.

Please refer to FIG. 4 and FIG. 8. On a side of the protective shield bottom surface 400 away from the protective shield side surface 410, a second concave part 404 is further arranged on a side close to the opening of the first concave part 403. The second concave part 404 is a circular concave part lower than the protective shield bottom surface 400, used for placing a bearing of the second rotation shaft 631 and fixing the second rotation shaft 631 on the bearing.

Please refer to FIG. 3, FIG. 4 and FIG. 7. Above the second concave part 404, the fan 640, the driven wheel 630 and another bearing of the second rotation shaft 631 is fixedly connected in sequence through the second rotation shaft 631. A volute 610 is mounted on the protective shield 40 and is located above the fan 640. An upper cover 620 is further mounted on the volute 610 for arranging an air inlet 621.

Please refer to FIG. 3, FIG. 4 and FIG. 7. On the second concave part 404, the second rotation shaft 631 perpendicular to the protective shield bottom surface 400 is fixed through a bearing. The fan 640 is located above the second concave part 630 and is fixedly connected with the second rotation shaft 631, which allows the second rotation shaft 631 to drive the fan 640 to rotate. The fan 640 is a centrifugal fan.

Figure 10:
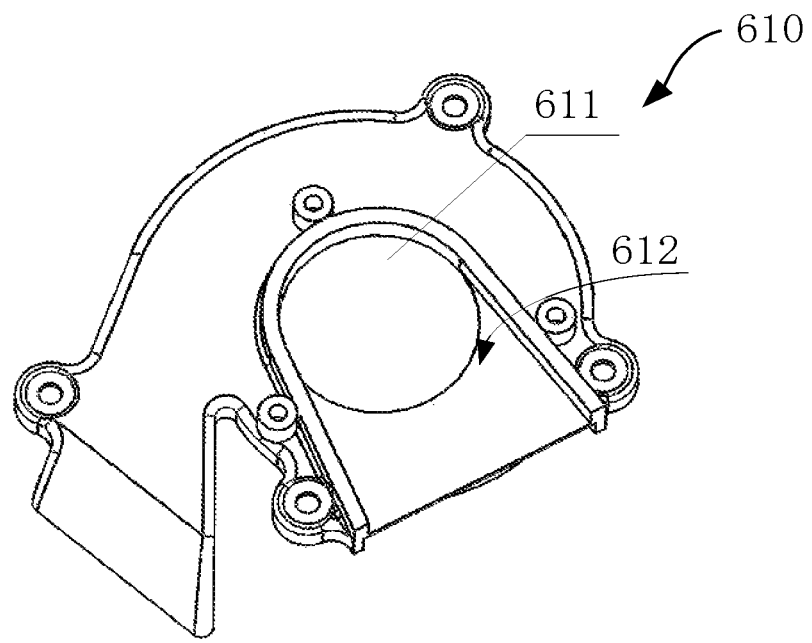
FIG. 10 is a front structural view of a volute of the string trimmer.
Figure 11:
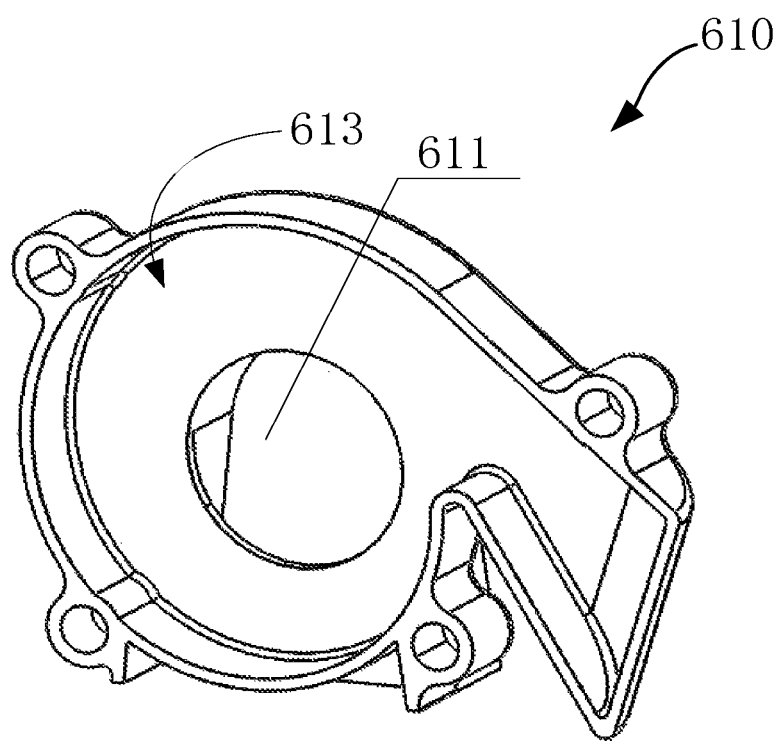
FIG. 11 is a rear structural view of the volute of the string trimmer.

Please refer to FIG. 4, FIG. 10 and FIG. 11. In an embodiment of the disclosure, the volute 610 is mounted above the fan 640. The volute 610 is fixed on the protective shield bottom surface 400 by a nut. A third concave part 613 is arranged on a side of the volute 610 close to the protective shield bottom surface 400, and the fan 640 is located in the third concave part 613. The third concave part 613 is in a shape of a "9", and a side wall of the third concave part 613 is in contact with the protective shield 40. A bottom surface of the third concave part 613 is provided with a fan through hole 611, and the fan through hole 611 allows the second rotation shaft 631 to pass through the fan through hole 611 to connect the fan 640 and the driven wheel 630. A radius of the fan through hole 611 is much greater than a radius of the second rotation shaft 631, and air entering from the air inlet 621 passes through the fan through hole 611 to the fan 640. A U-shaped concave part 612 is arranged on the other side of the volute 610. The U-shaped concave part 612 is used for placing the driven wheel 630 and belt 561. An opening of the U-shaped concave part 612 faces the driving wheel 560 and corresponds to the opening of the first concave part 403.

Further, please refer to FIG. 3, FIG. 4 and FIG. 7. The driven wheel 630 is located on a side of the fan 640 away from the second concave part 630, and is arranged on the U-shaped concave part 612 of the volute 610. The second rotation shaft 631 passes through a center of the driven wheel 630 and allows the second rotation shaft 631 to drive the driven wheel 630 to rotate. And heights of the driven wheel 630 and the driving wheel 560 on the protective shield bottom surface 400 are the same. In this embodiment, the driving wheel 560 and the driven wheel 630 are connected through the belt 561. In other embodiments, a chain transmission may also be set between the driving wheel 560 and the driven wheel 630.

Please refer to FIG. 3 through FIG. 6. The upper cover 620 is arranged on the volute 610, and the upper cover 620 is fixedly connected above the U-shaped concave part 612. The upper cover 620 is provided with a plurality of air inlets 621, and the volute 610 defines an air passage of the fan 640.

Figure 5:
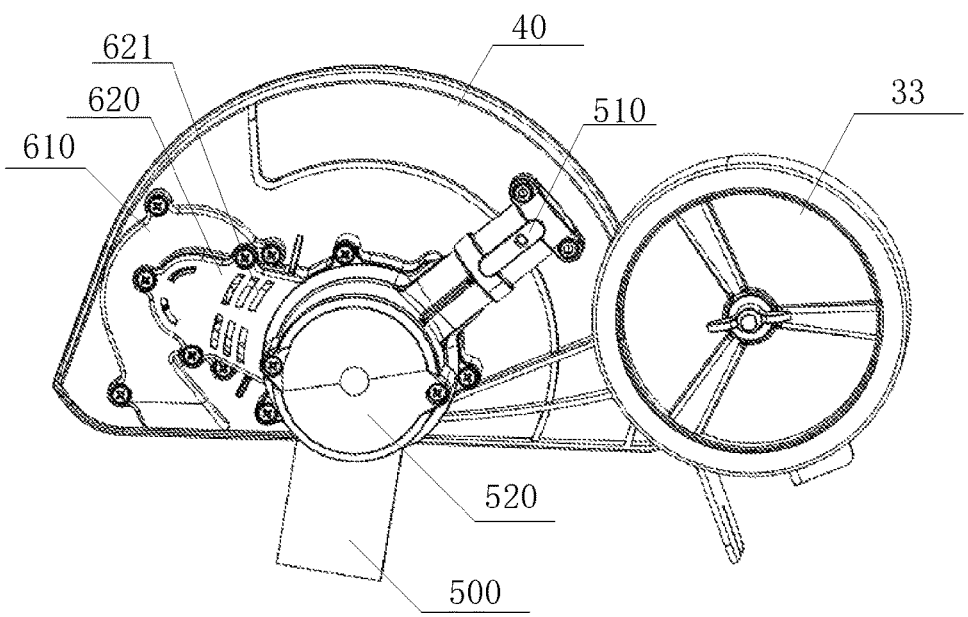
FIG. 5 is a front structural view of the working end of the belt string trimmer.

Please refer to FIG. 5 and FIG. 8. An air outlet 405 is further arranged on the protective shield bottom surface 400 and in an area covered by the volute 610. The air outlet 405 may be in any shape. In this embodiment, the air outlet 405 is, for example, a rectangle. The air enters through the air inlet 621 on the upper cover 620, passes through the air passage of the volute 610, and then passes through the air outlet 405 on the protective shield 40 to the other side of the protective shield 40, which means a side where the blade 500 is located.

Please refer to FIG. 1 and FIG. 4. In an embodiment of the disclosure, the blade 500 is located on the other side of protective shield 40 relative to the fan 640. The blade 500 is fixed on the first rotation shaft 531 through the blade fixing base 570 in the first through hole 401. The blade 500 is in a rectangular shape. The first rotation shaft 531 passes through a center of the blade 500. When the blade 500 rotates, both ends of the blade 500 are inside an arc side of the protective shield bottom surface 400, but extend out of the straight side of the protective shield bottom surface 400. On a side of the blade 500 away from the blade fixing base 570, a blade plate 501 and a nut are sequentially fixed on the first rotation shaft 531 for fixing the blade 500.

Please refer to FIG. 1 and FIG. 8. In an embodiment of the disclosure, on the protective shield 40, a traveling wheel connecting device 402 is further arranged on a side close to the connecting rod 31 for fixing a traveling wheel 33 and pushing the string trimmer 1 to move.

Please refer to FIG. 3 and FIG. 12. When the power supply assembly 10 supplies power for the first motor 530 and the control assembly 20 sends out a control signal, the first motor 530 works to drive the output end of the first motor 530, which means that the first rotation shaft 531 is driven to rotate, thereby driving the driving wheel 560 and the blade 500 fixedly connected with the first rotation shaft 531 to rotate, and then the string trimmer 1 realizes a mowing function. At the same time, the driving wheel 560 drives the driven wheel 630 connected with the driving wheel 560 through the belt 561 to rotate, thereby driving the fan 640 fixedly connected with the driven wheel 630 to rotate, so as to realize a blowing function of the string trimmer 1. In this embodiment, a radius of the driving wheel 560 is different from a radius of the driven wheel 630, so that the rotation speeds of the first rotation shaft 531 and the second rotation shaft 631 are different, and thus the rotation speeds of the fan 640 and the blade 500 are different. A rotation speed ratio between the first rotation shaft 531 and the second rotation shaft 631 is, for example, from 0.5 to 4.

Please refer to FIG. 13 through FIG. 26. In other embodiments of the disclosure, the rotation speed of the first rotation shaft 531 is controlled by the first motor 530, and the rotation speed of the second rotation shaft 631 is controlled by the second motor 632, so that the first rotation shaft 531 and the second rotation shaft 631 are independently controlled, and both of the first rotation shaft 531 and the second rotation shaft 631 may obtain suitable rotation speeds. In these embodiments, the driving wheel 560, the driven wheel 630 and the belt 561 do not need to be arranged, but the second motor 632 needs to be arranged to drive the second rotation shaft 631 to rotate. In this embodiment, the cutting assembly 50 mainly includes the first motor 530 and the blade 500, and the blowing assembly mainly includes the second motor 632 and the fan 640.

Please refer to FIG. 12 through FIG. 23. In an embodiment of the disclosure, the protective shield 40 is semicircular. The whole of the protective shield 40 is the same as the previous embodiments. The protective shield 40 includes the protective shield bottom surface 400 and the protective shield side surface 410. The protective shield bottom surface 400 is a main body of the protective shield 40 and is semicircular. The protective shield side surface 410 is arranged on an arc side of the protective shield bottom surface 400, and the protective shield side surface 410 is perpendicular to the protective shield bottom surface 400. And the first through hole 401 is arranged close to the middle part of the straight side of the protective shield bottom surface 400, and the first through hole 401 is circular. The blade fixing base 570 is placed in the first through hole 401. The blade fixing base 570 is provided with the second through hole 572, and the first rotation shaft 531 is allowed to pass through the second through hole 572 to the other side of the protective shield bottom surface 400. When the first motor 530 works, the first rotation shaft 531 rotates, and the blade 500 connected with the first rotation shaft 531 rotates. The blade fixing base 570 is further provided with at least one U-shaped groove 571 which is located on the side close to the first motor 530. In this embodiment, the number of U-shaped grooves 571 is, for example, two.

Figure 13:
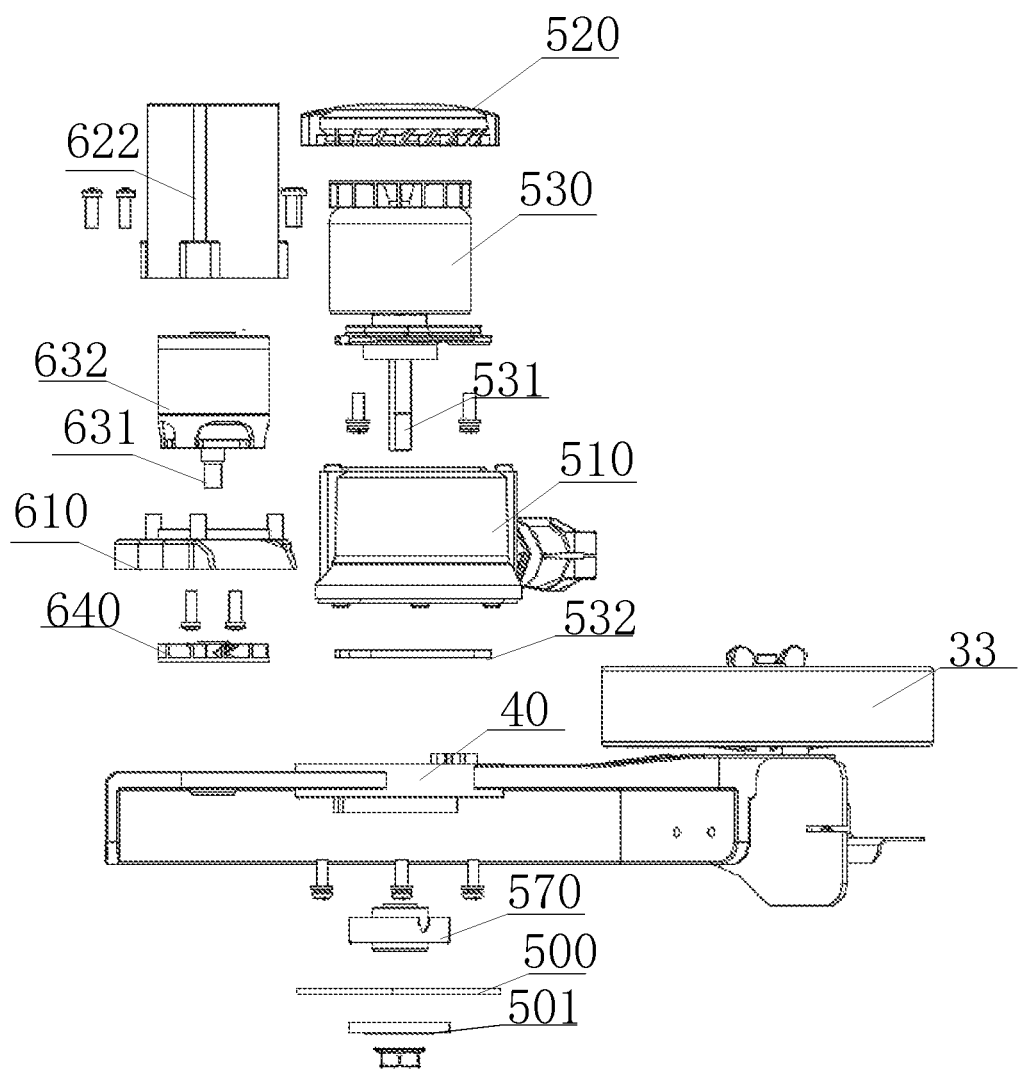
FIG. 13 is an exploded view of a dual-motor string trimmer.
Figure 16:
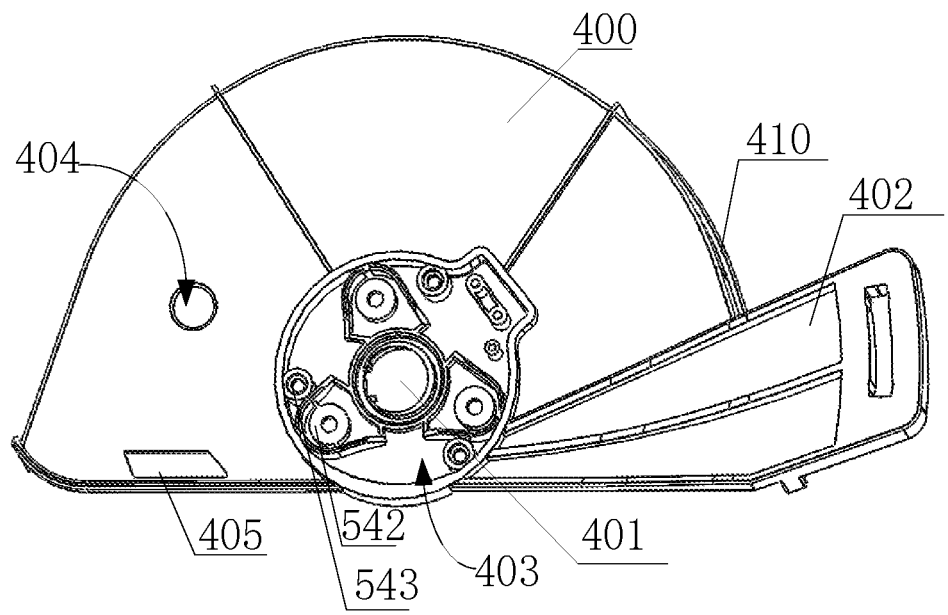
FIG. 16 is a structural view of a protective shield of the dual-motor string trimmer.

Further, please refer to FIG. 13 and FIG. 16. The first concave part 403 is arranged on the side of the protective shield bottom surface 400 away from the protective shield side surface 410 and at the periphery of the first through hole 401. The first motor 530 is placed on the first concave part 403. The first rotation shaft 531, the output end of the first motor 530, passes through the first through hole 401 at a center of the first concave part 403 to the other side of the protective shield 40 and is connected with the blade 500 on the other side of the protective shield 40. When the first motor 530 works, the first rotation shaft 531 rotates and drives the blade 500 connected with the first rotation shaft 531 to rotate.

Further, please refer to FIG. 13 and FIG. 16. In the first concave part 403, a plurality of shock-absorption pad holes 542 are arranged at the periphery of the first through hole 401 for fixing the shock-absorption pad 532. The number of the shock-absorption pad holes 542 is, for example, three, and the plurality of shock-absorption pad holes 542 are evenly distributed on a circumference with the first through hole 401 as a center of the circle. In the first concave part 403, a plurality of casing fixing holes 543 are arranged for fixing the first casing 510 at the periphery of the shock-absorption pad hole 542. The number of the casing fixing holes 543 is, for example, 3.

Please refer to FIG. 13 through FIG. 16. In an embodiment of the disclosure, a shock-absorption pad 532, a first motor 530 and a first casing 510 are sequentially mounted above the first concave part 403, and the shock-absorption pad 532 and the first motor 530 are arranged in the first casing 510.

Further, please refer to FIG. 13 through FIG. 16. In an embodiment of the disclosure, the first casing 510 is in a through hollow cylindrical shape which includes a cylindrical side surface. One side of the first casing 510 is fixed on the casing fixing hole 543 in the first concave part 403 by bolts, and the other side of the first casing 510 is provided with the motor cover 520. The first motor 530 is located in a cylindrical space defined by the first casing 510, the motor cover 520 and the first concave part 403. The output end of the first motor 530, namely the first rotation shaft 531, passes through the second through hole 572 of the blade fixing base 570 in the protective shield 40 and is fixedly connected with the blade 500.

Figure 14:
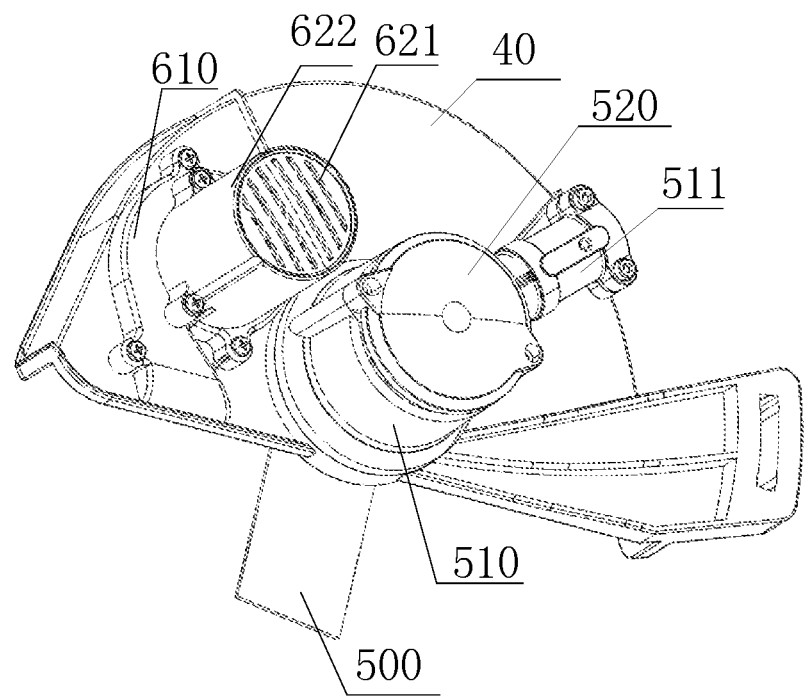
FIG. 14 is a front structure view of a working end of the dual-motor string trimmer.

Further, please refer to FIG. 14. In an embodiment of the disclosure, the handle 511 is arranged on the first casing 510, and the handle 511 is fixedly connected with the connecting rod 31. The handle 511 is in a cylindrical hollow structure. The cylindrical hollow structure in the handle 511 communicates with a cylindrical space of the first casing 510 and penetrates the hollow connecting rod 31, which realizes an electrical connection of the control assembly 20 and the power supply assembly 10 with the first motor 530.

Please refer to FIG. 13. In an embodiment of the disclosure, the shock-absorption pad 532 is further arranged between the first motor 530 and the first concave part 403. The shock-absorption pad 532 is arranged between the first motor 530 and the first concave part 403 to prevent a vibration generated by the first motor 530 from affecting an operation of the blade 500 on the other side of the protective shield 40 when the first motor 530 is working.

Figure 15:
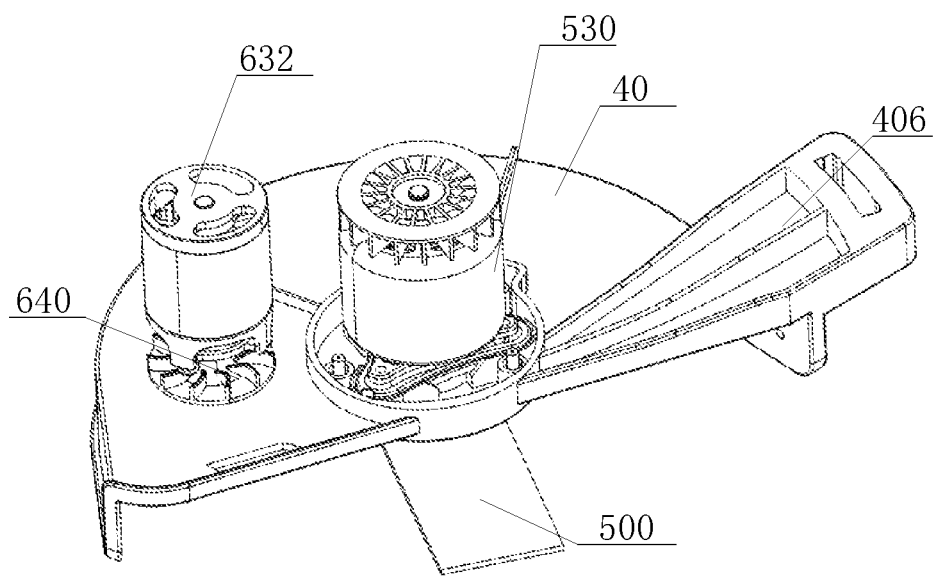
FIG. 15 is a side structural view of the working end of the dual-motor string trimmer.

Please refer to FIG. 13, FIG. 15 and FIG. 16. A second concave part 404 is arranged on the protective shield 40, on a side of the fan 640 and a side away from the handle 511. The second concave part 404 is a circular concave part lower than the protective shield bottom surface 400 for placing the bearing of the second rotation shaft 631 and fixing the second rotation shaft 631 on the bearing, and the second rotation shaft 631 is perpendicular to the protective shield bottom surface 400.

Please refer to FIG. 13 through FIG. 26. In an embodiment of the disclosure, the fan 640 and the second motor 632 are fixedly connected above the second concave portion 404 through the second rotation shaft 631.

Please refer to FIG. 13 through FIG. 18. In an embodiment of the disclosure, the fan 640 is the centrifugal fan. The fan 640 and the second motor 632 are sequentially fixedly connected above the second concave part 404 through the second rotation shaft 631. The fan 640 is mounted between the second motor 632 and the protective shield 40, and the fan 640 is close to the air outlet 405. The volute 610 is arranged above the fan 640, and the second casing 622 is mounted on the volute 610 and covers the second motor 632. A plurality of air inlets 621 are further arranged on a plane of the second casing 622 parallel to the fan 640, and the volute 610 defines the air passage of the fan 640. The air outlet 405 is arranged on the protective shield bottom surface 400 and in the area covered by the volute 610. The air enters from the air inlet 621 on the upper cover 620, passes through the air passage of the volute 610, and then passes through the air outlet 405 on the protective shield 40 to the other side of the protective shield bottom surface 400, which means the side where the blade 500 is located.

Figure 17:
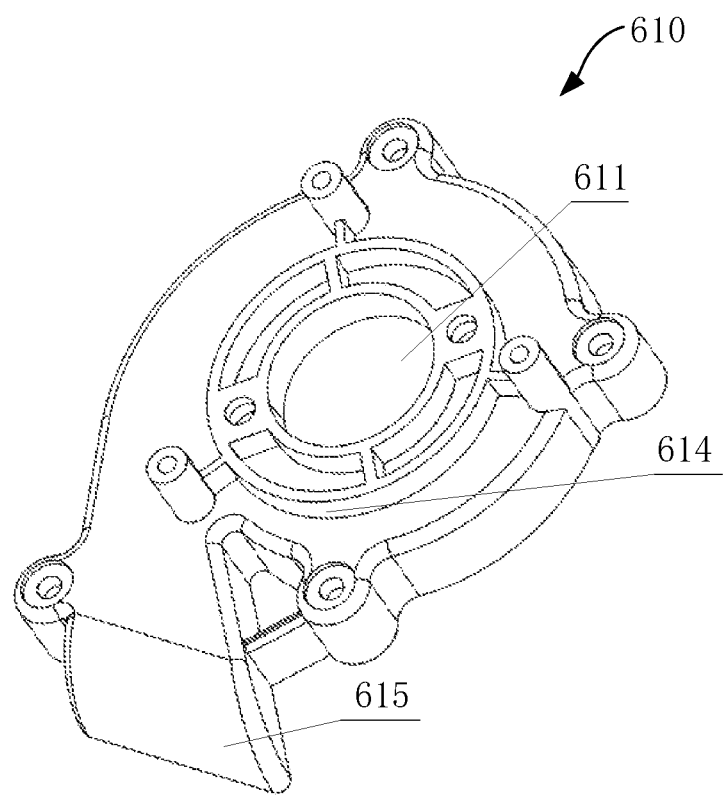
FIG. 17 is a front structural view of a volute of another string trimmer.
Figure 18:
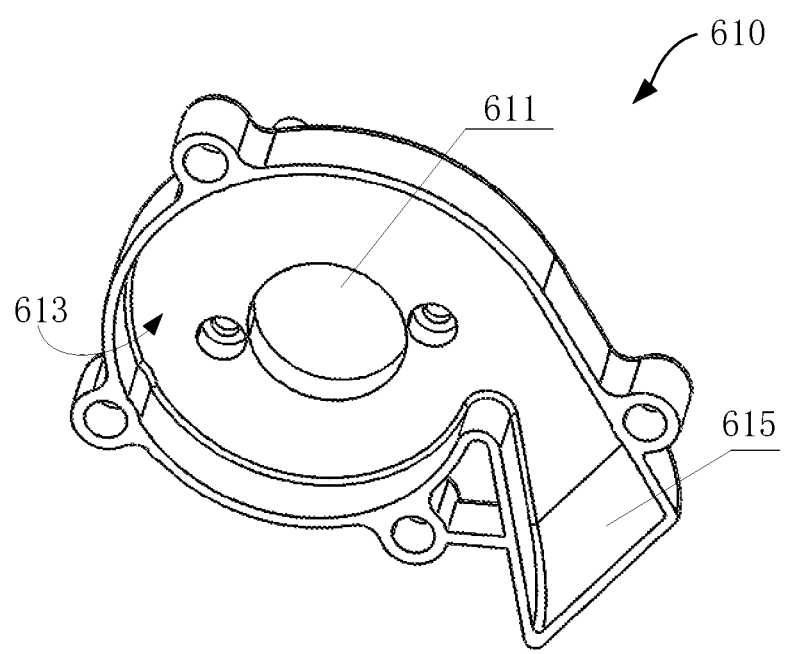
FIG. 18 is rear structural view of the volute of another string trimmer.
Figure 19:
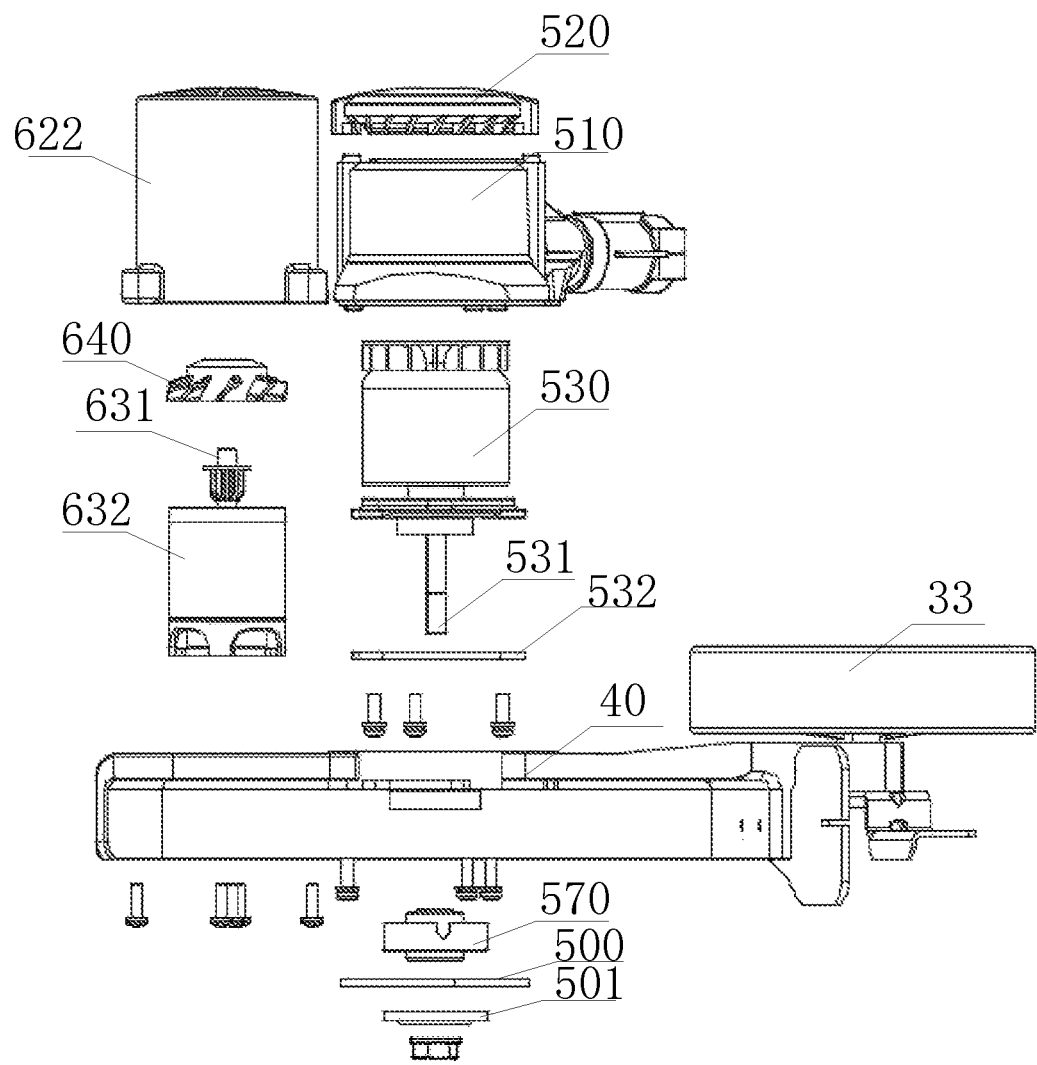
FIG. 19 is an exploded view of a working end of another dual-motor string trimmer.
Figure 20:
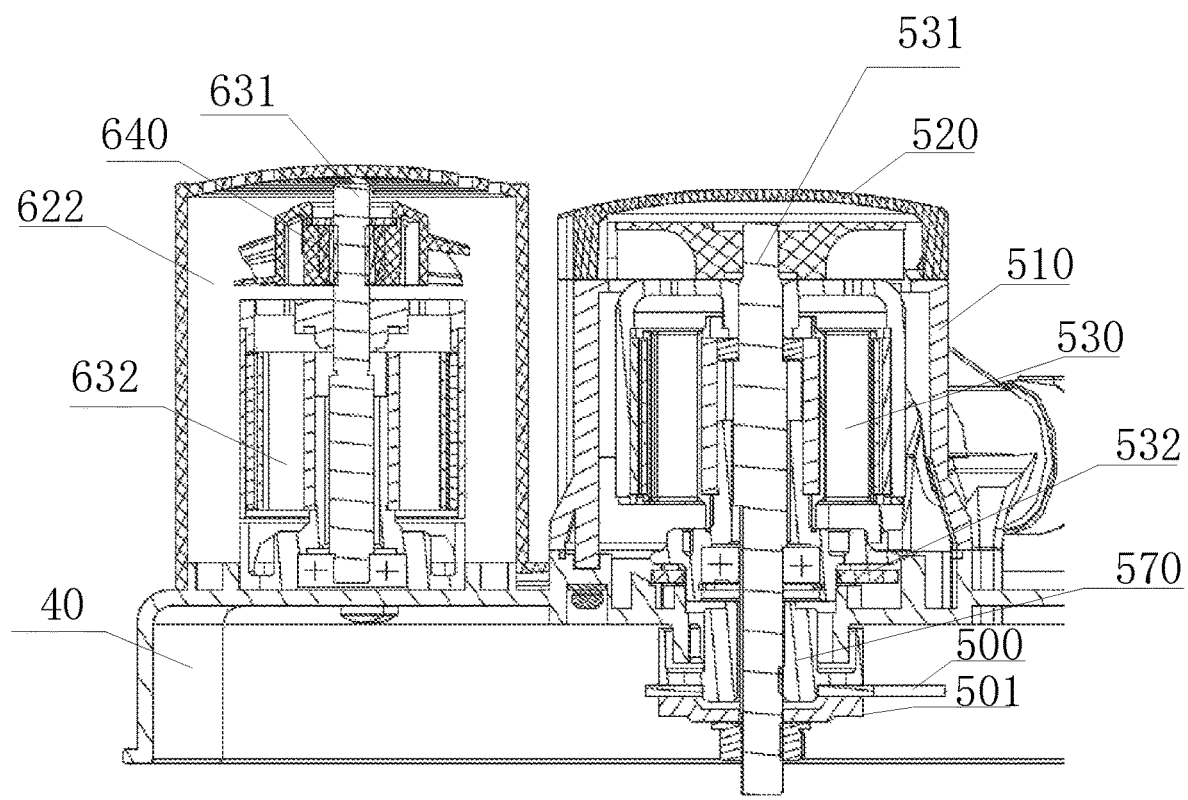
FIG. 20 is a cross-sectional view of the working end of another dual-motor string trimmer.
Figure 21:
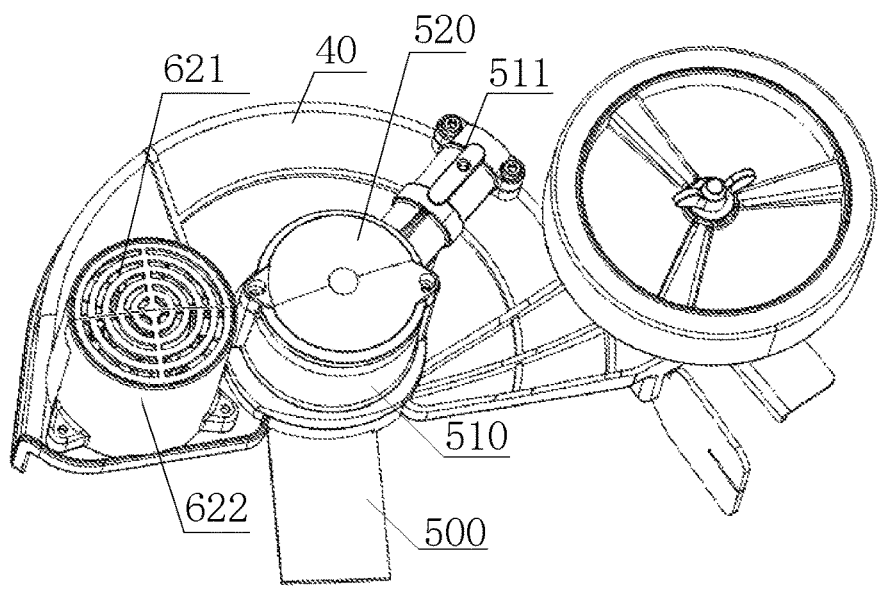
FIG. 21 is a side view of the working end of another dual-motor string trimmer.
Figure 22:
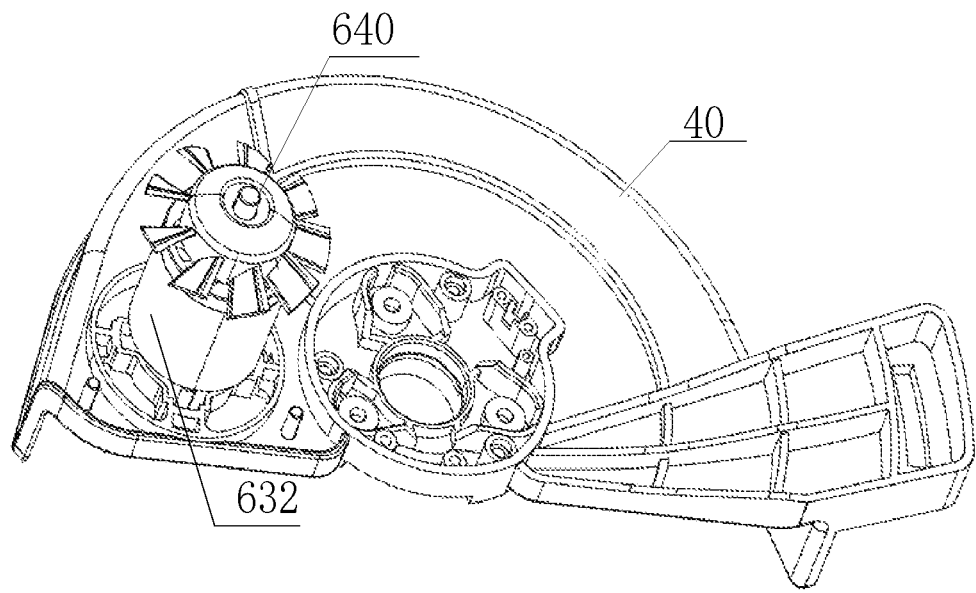
FIG. 22 is an internal structural view of the working end of another dual-motor string trimmer.
Figure 23:
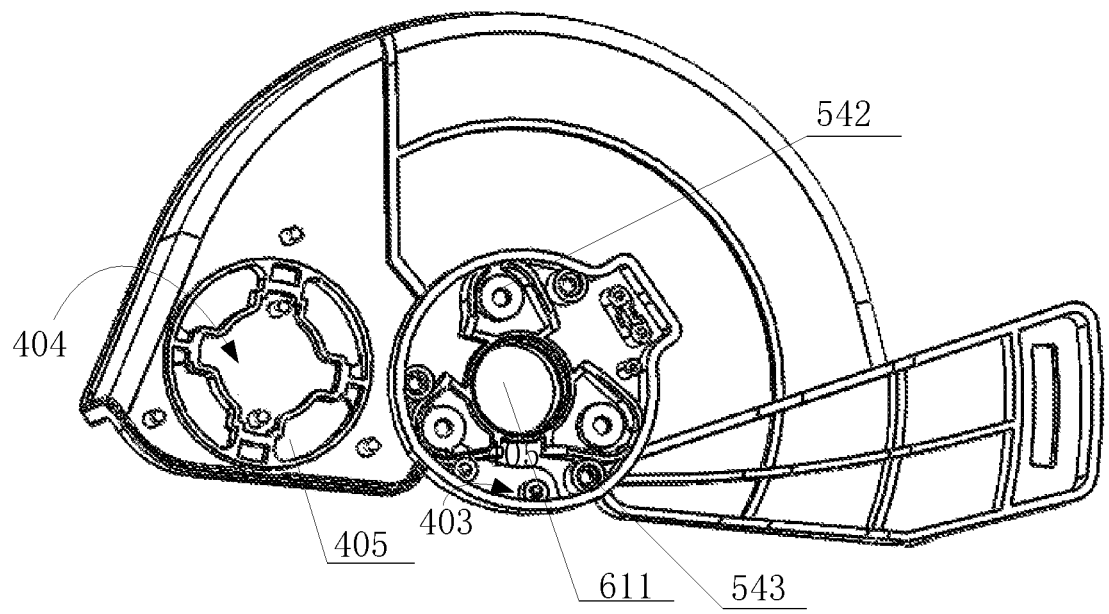
FIG. 23 is a structural view of a protective shield of another dual-motor string trimmer.

Please refer to FIG. 14, FIG. 17 and FIG. 18. In an embodiment of the disclosure, the volute 610 is fixed on the protective shield 40 by a nut. The third concave part 613 is arranged on a side of the volute 610 close to the protective shield 40. The third concave part 613 is in a shape of a "9", and a side wall of the third concave part 613 is in contact with the protective shield 40. The bottom surface of the third concave part 613 is provided with the fan through hole 611. The fan is located in the third concave part 613. The second rotation shaft 631 is fixedly connected with the fan 640 through the fan through hole 611.

Further, please refer to FIG. 17. On a side of the volute 610 away from the protective shield 40, with a center of the fan through hole 611 as the center, two side walls with different radii are surrounded to define a limiting structure 614 for limiting a position of the second motor 632. And a plurality of through holes penetrating through a surface of the third concave part 613 of the volute 610 are further arranged between the two side walls with different radii, and the air inlet 621 is used for air intake.

Further, please refer to FIG. 17 and FIG. 18. An air tube 615 is arranged at a tail end of the volute 610. The tube duct 615 is part of the volute 610. When the volute 610 is mounted on the protective shield 40, the air tube 615 is located above the air outlet 405, and the air tube 615 is a detachable structure.

Figure 26:
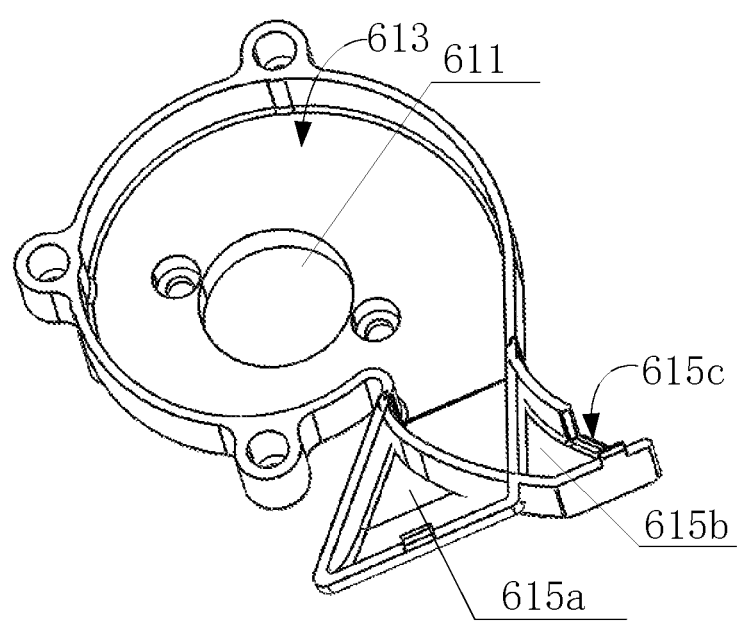
FIG. 26 is a rear structural view of a volute with double air tubes.

Please refer to FIG. 26. In another embodiment of the disclosure, the air tube 615 includes a trimming air tube 615*a* and a mowing air tube 615*b*. When the air tube 615 mounted in the volute 610 is a mowing air tube 615*b*, the mowing air tube 615*b* covers the air outlet 405 on the protective shield 40, and the air generated by the fan 640 is discharged from the air outlet 405. A direction of the air outlet is parallel to an axis of the motor shaft. When the air tube 615 mounted on the volute is a trimming air tube 615*a*, the trimming air tube 615*a* does not contact the air outlet 405 on the protective shield 40. And an air outlet opening 615*c* is arranged on a side of the trimming air tube 615*a* that is perpendicular to the protective shield bottom surface 400. The air outlet opening 615*c* is located away from a side away from the first motor 530. The air generated by the fan 640 is discharged through the air outlet opening 615*c*. The direction of the air outlet is perpendicular to the axis of the motor shaft and parallel to the straight side of the protective shield bottom surface 400.

Please refer to FIG. 20 through FIG. 23. In another embodiment of the disclosure, the fan 640 is, for example, an axial flow fan. The second motor 632 and the fan 640 are sequentially fixedly connected above the second concave part 404 through the second rotation shaft 631. The second motor 632 is directly mounted on the protective shield 40 and above the second concave part 404. The fan 640 is mounted on a side of the second motor 632 away from the protective shield 40. And close to the air outlet 405, the second casing 622 is mounted on the protective shield 40 and above the second concave part 404. And the second casing 622 covers the second motor 632. In this embodiment, the plurality of air inlets 631 on the second casing 622 are arc-shaped and distributed around a concentric circle. Further, in this embodiment, the second concave part 404 is a circular structure with a plurality of protruding parts, and a radius of the circular structure is substantially equal to the radius of the second motor 632. The protective shield 40 is further provided with a plurality of air outlets 405, the plurality of the air outlets 405 are arranged around the second concave part 404, and the plurality of air outlets 405 are covered by the second casing 622. When an axial flow motor rotates, the air enters from the air inlet 621 at a top of the second casing 622, passes through a gap between the second casing 622 and the second motor 632, and then is discharged through the plurality of the air outlets 405 on the protective shield 40. In this embodiment, the volute 610 does not need to be arranged.

Figure 24:
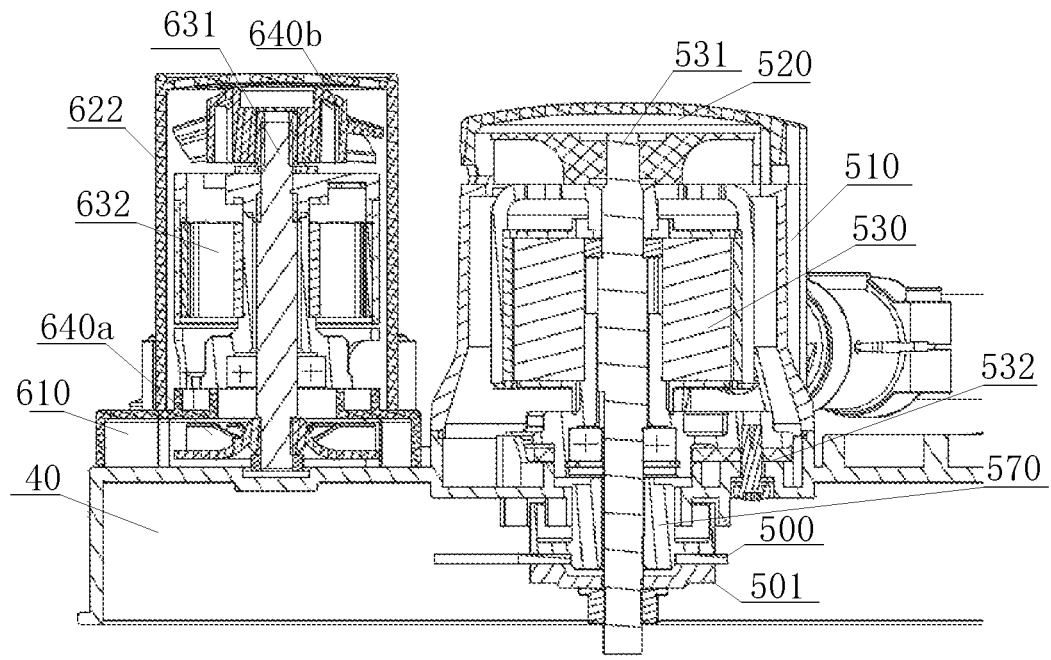
FIG. 24 is a cross-sectional view of a working end of a dual-motor string trimmer with multiple fans.
Figure 25:
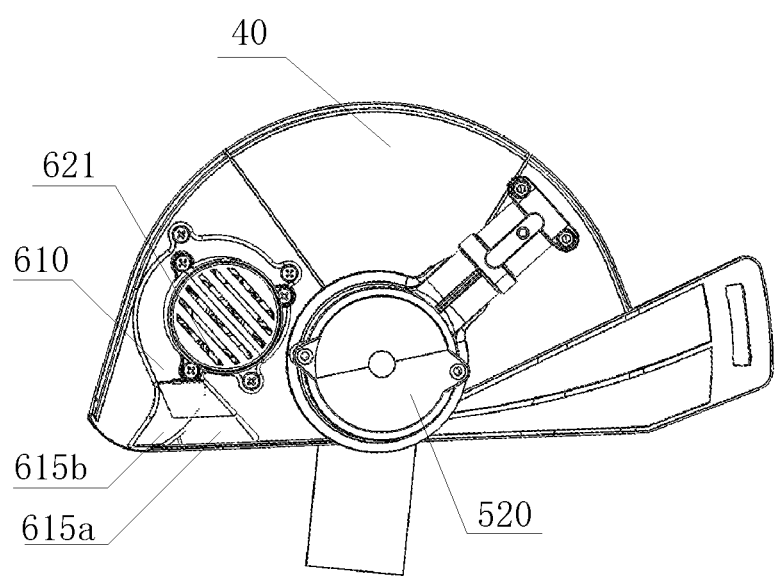
FIG. 25 is a side view of the working end of the dual-motor string trimmer with multiple fans.

Please refer to FIG. 24 through FIG. 26. In another embodiment of the disclosure, in order to increase an air power, a plurality of fans 640 are arranged, and the fans 640 include a first fan 640*a* and a second fan 640*b*. The first fan 640*a* is a centrifugal fan, located between the second motor 632 and the protective shield 40 and close to the air outlet 405. The second fan 640*b* is an axial flow fan, located on the side of the second motor 632 away from the protective shield 40 and close to the air inlet 621. The centrifugal fan and the axial flow fan are used at the same time to increase the air power of the fan 640.

Please refer to FIG. 13 through FIG. 26. A position and fixing way of the blade 500 of the string trimmer 1 of the disclosure is the same as in the previous embodiments, which is located on the other side of the protective shield 40 relative to the fan 640 and fixed on the first rotation shaft 531 through the blade fixing base 570. On the side of the blade 500 away from the blade fixing base 570, a blade plate 501 and a nut are sequentially fixed on the first rotation shaft 531 for fixing the blade 500.

Please refer to FIG. 13 and FIG. 26. In an embodiment of the disclosure, on the protective shield 40, the traveling wheel connecting device 402 is arranged on the side close to the connecting rod 31 for fixing a traveling wheel 33 to push the string trimmer 1 to move.

Please refer to FIG. 13 and FIG. 26. When the power supply assembly 10 supplies power for the first motor 530 and the second motor 632, and the control assembly 20 sends out a control signal, the first motor 530 and the second motor 632 work, the first motor 530 drives the output end of the first motor 530, which means that the first rotation shaft 531 is driven to rotate, thereby driving the blade 500 fixedly connected with the first rotation shaft 531 to rotate, and then the string trimmer 1 realizes a mowing function. At the same time, the second motor 632 drives the second rotation shaft 631 at the output end of the second motor 632 to rotate, thereby driving the fan 640 fixedly connected with the second motor 632 to rotate, so as to realize the blowing function of the string trimmer 1. In this embodiment, powers of the first motor 530 and the second motor 632 are different, rotation speeds of the first rotation shaft 531 and the second rotation shaft 631 are different, and thus the rotation speeds of the fan 640 and the blade 500 are different. A rotation speed ratio between the first rotation shaft 531 and the second rotation shaft 631 is, for example, from 0.5 to 4.

The disclosure provides a string trimmer. Firstly, in one of the embodiments, in a case of a small transmission ratio, a center distance between a motor shaft (the first rotation shaft 531) and a fan blade shaft (the second rotation shaft 631) may be increased, so that a diameter of fan blades of the fan 640 may be increased, and then the air force increases, which prevents a diameter of the fan blade from being affected by a motor structure. In other embodiments, the fan 640 and the blade 500 are controlled independently. The center distance between the motor shaft (the first rotation shaft 531) and the fan blade shaft (the second rotation shaft 631) may be increased, so that the diameter of the fan blades of the fan 640 may be increased, and then the air force increases, which prevents the diameter of the fan blade from being affected by the motor structure.

Secondly, the fan blade shaft (the second rotation shaft 631) is not coaxial with the motor shaft (the first rotation shaft 531), a structure of the fan blade is not affected by the motor, and a centrifugal blade or an axial flow blade may be used.

Furthermore, in one embodiment, a belt transmission may keep the fan blades of the fan 640 away from the motor shaft (the first rotation shaft 531), so that the blade 500 on the motor shaft (the first rotation shaft 531) may obtain a greater cutting depth. In other embodiments, the fan 640 and the blade 500 are controlled independently. The belt transmission may keep the fan blades of the fan 640 away from the motor shaft (the first rotation shaft 531), so that the blade 500 on the motor shaft (the first rotation shaft 531) may obtain a greater cutting depth.

Finally, a gap between the driving wheel 560 and the driven wheel 630 is not affected by a structure of the first motor 530. A wide range of rotation speed ratios, from 0.5 to 4, may be obtained through a one-stage transmission or a separate control of different motors, and the diameter of the fan blades of the fan 640 is not affected under any rotation speed ratio.

In the description of this specification, a description with reference to the terms "this embodiment", "embodiment", "specific embodiment", etc. means that a specific feature, structure, material or characteristic described in connection with this embodiment or example is included in at least one embodiment or example of the disclosure. In this specification, schematic representations of the above terms do not necessarily refer to the same embodiment or example. Furthermore, the particular features, structures, materials or characteristics described may be combined in any suitable manner in any one or more embodiments or examples.

The embodiments of the disclosure described above are only used to help illustrate the disclosure. The embodiments do not exhaustively describe all the details, nor do they limit the disclosure to the specific embodiments described. Obviously, many modifications and variations are possible according to this specification. The embodiments are specifically described in the specification in order to better explain the principles and practical applications of the disclosure, so that those skilled in the art can well understand and utilize the disclosure. The disclosure is limited only by the claims and their full scope and equivalents.

What is claimed is:

1. A string trimmer, comprising:
    a protective shield, provided with an air outlet,
    a first motor, arranged on one side of the protective shield,
        a first rotation shaft of the first motor penetrating the protective shield to the other side of the protective shield,
    a blade, arranged on the other side of the protective shield and connected with the first rotation shaft,
    a fan, arranged on the same side as the first motor, and mounted on the protective shield through a second rotation shaft, and
    a volute, wherein a tail part of the volute is provided with an air tube, the air tube comprises a trimming air tube and a mowing air tube, the mowing air tube covers the air outlet, and the trimming air tube does not contact the air outlet,
    wherein a rotation speed ratio between the second rotation shaft and the first rotation shaft ranges from 0.5 to 4.

2. The string trimmer according to claim 1, wherein
    the protective shield is semicircular, and a radius of a protective shield bottom surface of the protective shield is greater than a radius of the blade.

3. The string trimmer according to claim 2, wherein
    the protective shield bottom surface is provided with a first through hole, the first through hole is located in a middle part of a straight side of the protective shield bottom surface, a blade fixing base is arranged in the first through hole, a second through hole is arranged on the blade fixing base, and the second through hole allows the first rotation shaft to pass through.

4. The string trimmer according to claim 3, wherein
    the protective shield is provided with a first concave part located on one side of the fan, and the first concave part is arranged on a periphery of the first through hole.

5. The string trimmer according to claim 4, further comprising a first casing, wherein
    the first casing is mounted on the first concave part, is hollow cylindrical shaped and allows the first motor to be placed in the first casing, and a handle is arranged on the first casing, and the handle is connected with one end of a connecting rod.

6. The string trimmer according to claim 5, wherein the other end of the connecting rod is provided with a control device and a power supply device, the control device is connected with the first motor, and the power supply device is connected with the first motor and the control device.

7. The string trimmer according to claim 5, wherein the protective shield is provided with a second concave part, the second concave part is located on a side away from the handle, the fan is fixed on the second concave part through the second rotation shaft, and the second rotation shaft is perpendicular to the protective shield bottom surface.

8. The string trimmer according to claim 7, wherein the volute is fixed on the protective shield bottom surface, the fan is located between the volute and the protective shield, a side of the volute close to the protective shield is provided with a third concave part, a fan through hole is arranged on a bottom surface of the third concave part, and the fan through hole allows the second rotation shaft to pass through.

9. The string trimmer according to claim 8, wherein the air outlet is a through hole arranged on the protective shield bottom surface and is located on a side of the second concave part away from the first concave part.

10. The string trimmer according to claim 4, wherein an air outlet opening is arranged on a side of the trimming air tube in contact with the protective shield bottom surface, the air outlet opening is located on a side of the trimming air tube away from the first concave part, and an air direction of the air outlet opening is perpendicular to the first rotation shaft.

11. The string trimmer according to claim 4, wherein the volute comprises a U-shaped concave part on a side away from the fan, the U-shaped concave part is provided with an opening, and the opening of the U-shaped concave part is connected with an opening of the first concave part.

12. The string trimmer according to claim 11, further comprising an upper cover, wherein the upper cover is connected above the U-shaped concave part, and the upper cover is provided with a plurality of air inlets.

13. The string trimmer according to claim 11, further comprising a driving wheel and a driven wheel, wherein the driving wheel and the driven wheel are arranged on the same side as the fan, the driving wheel is connected with the first rotation shaft and is located in the first concave part, the driven wheel is connected with the second rotation shaft and is located in the U-shaped concave part, and the driving wheel and the driven wheel are connected through a belt.

14. The string trimmer according to claim 7, wherein the protective shield comprises a plurality of air outlets, and the plurality of the air outlets surround the second concave part.

15. The string trimmer according to claim 14, further comprising a second motor, wherein the second motor is arranged on the same side as the first motor, and the second motor is fixedly connected with the second rotation shaft.

16. The string trimmer according to claim 15, further comprising a second casing, wherein the second casing is located on the protective shield, the second motor is arranged in the second casing, and a plurality of air inlets are arranged on a top of the second casing.

17. The string trimmer according to claim 16, wherein the fan is a centrifugal fan, the fan and the second motor are connected in sequence above the second concave part through the second rotation shaft, and the fan is located between the protective shield and the second motor.

18. The string trimmer according to claim 16, wherein the fan is an axial flow fan, the fan and the second motor are connected in sequence above the second concave part through the second rotation shaft, and the fan is located on a side of the second motor away from the protective shield.

19. The string trimmer according to claim 16, wherein the fan comprises a first fan and a second fan, the first fan, the second motor and the second fan are connected in sequence above the second concave part through the second rotation shaft, the first fan is located between the protective shield and the second motor, and the second fan is located on a side of the second motor away from the protective shield.

* * * * *